US 10,116,576 B2

(12) United States Patent
Lim (10) Patent No.: US 10,116,576 B2
(45) Date of Patent: Oct. 30, 2018

(54) METHODS AND APPARATUS FOR RANDOM ACCESS OF HEVC BITSTREAM FOR MMT

(71) Applicant: Samsung Electronics Co., Ltd, Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 15/013,847

(22) Filed: Feb. 2, 2016

(65) Prior Publication Data

US 2017/0111285 A1   Apr. 20, 2017

Related U.S. Application Data

(60) Provisional application No. 62/243,203, filed on Oct. 19, 2015, provisional application No. 62/244,936, filed on Oct. 22, 2015.

(51) Int. Cl.
*H04L 12/801* (2013.01)
*H04N 19/44* (2014.01)
*H04L 29/06* (2006.01)

(52) U.S. Cl.
CPC .......... *H04L 47/34* (2013.01); *H04L 65/4069* (2013.01); *H04L 65/4084* (2013.01); *H04L 65/602* (2013.01); *H04L 65/607* (2013.01); *H04N 19/44* (2014.11)

(58) Field of Classification Search
CPC . H04L 65/602; H04L 65/607; H04L 65/4069; H04L 65/4084; H04L 47/34
See application file for complete search history.

(56) References Cited

U.S. PATENT DOCUMENTS

| | | | |
|---|---|---|---|
| 2005/0152457 A1* | 7/2005 | Regunathan | H04N 19/159 375/240.25 |
| 2012/0314762 A1 | 12/2012 | Herrmann et al. | |
| 2013/0107953 A1 | 5/2013 | Chen et al. | |
| 2014/0082146 A1 | 3/2014 | Bao et al. | |
| 2014/0098811 A1 | 4/2014 | Bouazizi et al. | |
| 2014/0136727 A1 | 5/2014 | Lim et al. | |
| 2014/0149545 A1 | 5/2014 | Bouazizi et al. | |
| 2014/0161181 A1* | 6/2014 | Samuelsson | H04N 19/503 375/240.12 |
| 2014/0192893 A1 | 7/2014 | Sullivan et al. | |
| 2014/0317664 A1 | 10/2014 | Park et al. | |

(Continued)

OTHER PUBLICATIONS

Korean Intellectual Patent Office, "International Search Report," International Application No. PCT/KR2016/011689, dated Jan. 23, 2017, 4 pages, publisher KIPO, Daejeon, Republic of Korea.

(Continued)

*Primary Examiner* — Feben Haile (57) ABSTRACT

A method and apparatus for randomly accessing high efficiency video coding (HEVC) bitstream for moving picture experts group (MPEG) media transport (MMT). The method includes receiving a plurality of packets for a video in decoding order. The method also includes determining a packet marked to begin processing the video, removing packets of leading pictures in the marked packet from the memory, and processing the packets remaining in the memory.

12 Claims, 5 Drawing Sheets

(56) References Cited

U.S. PATENT DOCUMENTS

| | | |
|---|---|---|
| 2015/0032845 A1 | 1/2015 | Bouazizi et al. |
| 2015/0139338 A1* | 5/2015 | Samuelsson ....... H04N 21/8455 375/240.26 |
| 2015/0281770 A1 | 10/2015 | Lim et al. |

OTHER PUBLICATIONS

Korean Intellectual Patent Office, "Written Opinion," International Application No. PCT/KR2016/011689, dated Jan. 23, 2017, 7 pages, publisher KIPO, Daejeon, Republic of Korea.
Extended European Search Report regarding Application No. 168577443, dated Sep. 10, 2018, 7 pages.

* cited by examiner

METHODS AND APPARATUS FOR RANDOM ACCESS OF HEVC BITSTREAM FOR MMT

CROSS-REFERENCE TO RELATED APPLICATION(S) AND CLAIM OF PRIORITY

This application claims priority under 35 U.S.C. § 119(e) to U.S. Provisional Patent Application No. 62/243,203 filed on Oct. 19, 2015, entitled "METHODS AND APPARATUS FOR RANDOM ACCESS OF HEVC BITSTREAM FOR MMT." The above-identified provisional patent application is hereby incorporated by reference in its entirety. This application also claims priority under 35 U.S.C. § 119(e) to U.S. Provisional Patent Application No. 62/244,936 filed on Oct. 22, 2015, entitled "METHODS AND APPARATUS FOR RANDOM ACCESS OF HEVC BITSTREAM FOR MMT." The above-identified provisional patent application is hereby incorporated by reference in its entirety.

TECHNICAL FIELD

This disclosure relates generally to media data conversion. More specifically, this disclosure relates to methods and apparatus for random access of high efficiency video coding (HEVC) bitstream for moving picture experts group (MPEG) media transport (MMT).

BACKGROUND

MMT is a digital container standard or format that specifies technologies for the delivery of coded media data for multimedia service over heterogeneous IP network environments. The delivered coded media data includes both audio-visual media data requiring synchronized decoding and presentation of a specific unit of data in a designated time, namely timed data, and other types of data that are decoded and presented in an arbitrary time based on the context of service or interaction by the user, namely non-timed data.

SUMMARY

This disclosure provides methods and apparatus for random access of HEVC bitstream for MMT.

In one embodiment, a decoder for randomly accessing high efficiency video coding (HEVC) bitstream for moving picture experts group (MPEG) media transport (MMT) is provided. The decoder includes a memory configured to store a plurality of packets for a video and processing circuitry operably connected to the memory. The processing circuitry is configured to receive a plurality of packets for a video in decoding order. The processing circuitry is also configured to determine a fragment packet to begin processing the video, remove packets of leading pictures in the fragment packet from the memory, and process the packets remaining in the memory.

In another embodiment, a method for randomly accessing HEVC bitstream for MMT is provided. The method includes receiving a plurality of packets for a video in decoding order. The method also includes determining a packet marked to begin processing the video, removing packets of leading pictures in the marked packet from the memory, and processing the packets remaining in the memory.

In a third embodiment, a server for randomly accessing HEVC bitstream for MMT is provided. The server includes a memory and one or more processors operably connected to the memory. The one or more processors configured to encode a header of a packet with fragment information indicating a first packet containing a full or part of bitstream of independently decodable video frame when the packet begins a group of pictures, encode the header of the packet with dependency information indicating dependencies among packets carrying a full or part of bitstream of video frames indicating their decoding dependency in the group of pictures, and transmit the plurality of packets.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Moving picture experts group (MPEG) media transport (MMT) was originally designed on the assumption that bitstreams are composed of random access points with SAP Type 1. However, there is no restriction to support other second audio program (SAP) Types in the current MMT standard. In addition, high efficiency video coding (HEVC) specification defines recommendation to Systems layer operation for random access of bitstream with SAP type 2 and 3.

According to the sub-clause 6.6.2.3.2.4 of ISO/IEC 23008-2:2015, to support use of HEVC bitstream with SAP type 2 or 3 for a media processing unit (MPU) following operations should be done by MMT Server to create MMTP bitstream.

When a random access is occurred at the random access point with a clean random access (CRA) or broken link access (BLA) picture in an HEVC bitstream, the associated random access skipped leading (RASL) pictures are discarded from the HEVC bitstream before fed into an HEVC decoder. The network abstraction layer (NAL) units of the CRA/BLA and the RASL pictures can be identified by NAL unit type (NUT), which is signaled in NAL unit header (NUH) or in HEVCDecoderConfigurationRecord of HEVC-ConfigurationBox. When the NUTs of NAL Units at the random access point are CRA, the variable HandleCraAs-BlaFlag of the HEVC decoder is set equal to 1, or the NUHs of the NAL Units of the CRA picture are rewritten by changing the values of NUTs from 21 to 17 in the HEVC bitstream. This is because the CRA picture shall be handled as a BLA picture in the HEVC decoder, when a random access is occurred. The decoded picture buffer (DPB) of the HEVC decoder is refreshed before the CRA/BLA picture is decoded.

Figure 1:
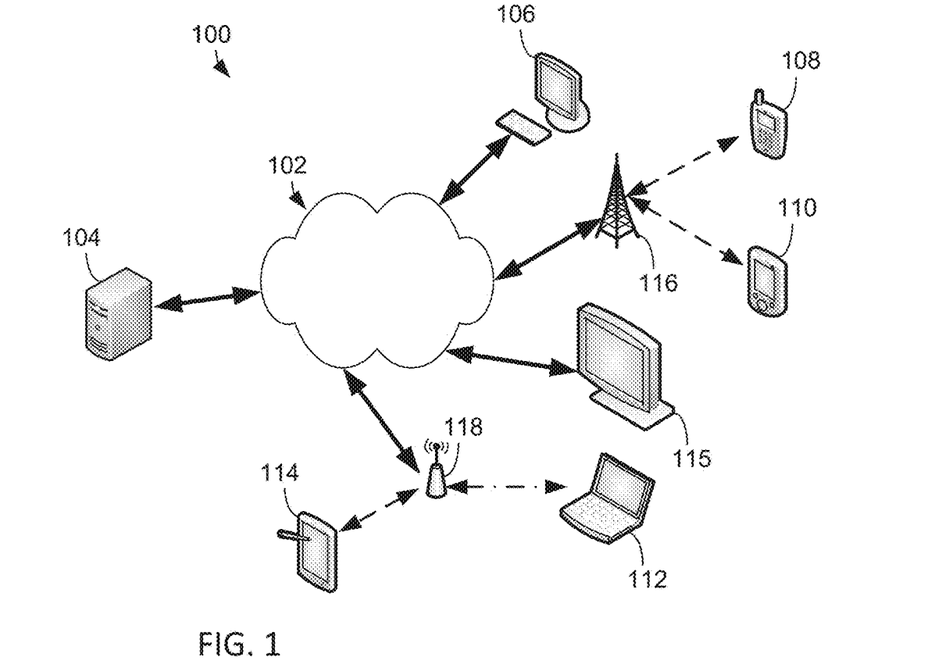
FIG. 1 illustrates an example computing system according to various embodiments of the present disclosure.

FIG. 1 illustrates an example computing system 100 according to this disclosure. The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

In this illustrative embodiment, computing system 100 provides for random access of HEVC bitstream for MMT. For example, server 104 or client devices 108-114 may provide for operation of MMT server and MMT clients to support use of HEVC bitstream with SAP type 2 and 3 only relying on information in a header of the MMTP packet.

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
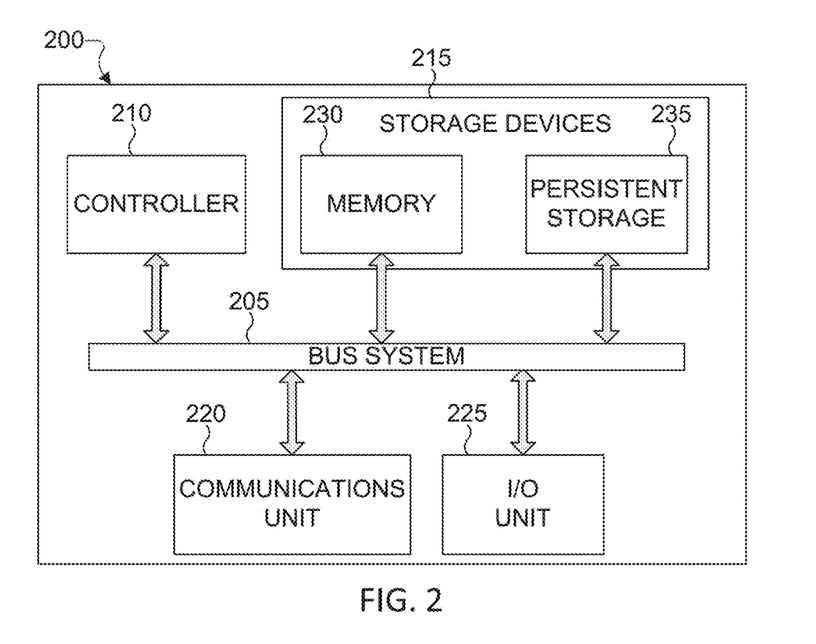
FIGS. 2 and 3 illustrate example devices in a computing system according to various embodiments of the present disclosure.
Figure 3:
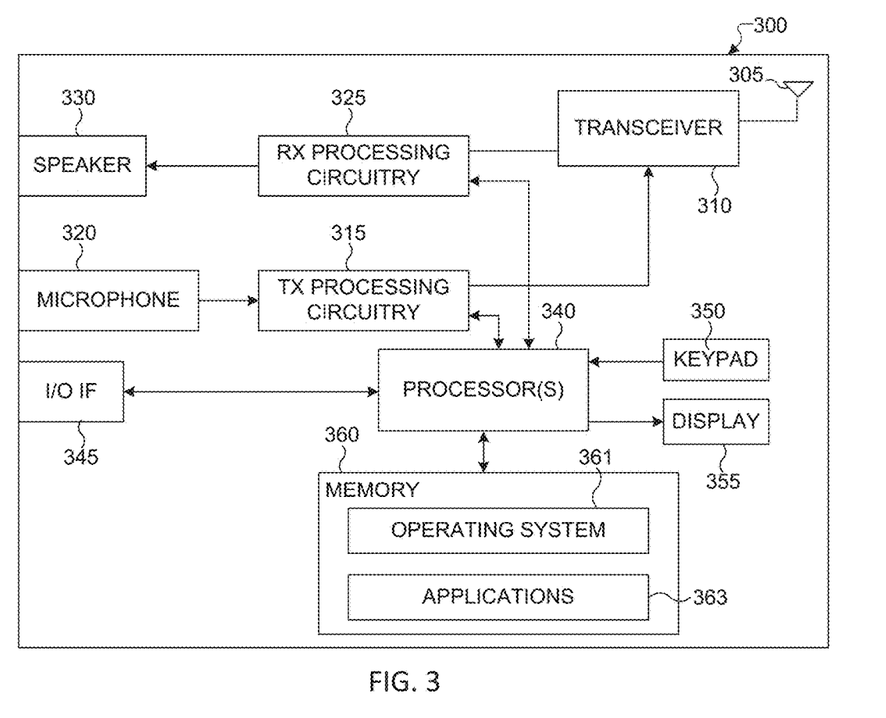

FIGS. 2 and 3 illustrate example devices in a computing system according to this disclosure. In particular, FIG. 2 illustrates an example server 200, and FIG. 3 illustrates an example client device 300. The server 200 could represent the server 104 in FIG. 1, and the client device 300 could represent one or more of the client devices 106-114 in FIG. 1.

As shown in FIG. 2, the server 200 includes a bus system 205, which supports communication between one or more processors 210, at least one storage device 215, at least one communications unit 220, and at least one input/output (I/O) unit 225.

The processor(s) 210 execute instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. The processor(s) 210 is configured to perform operations for unlocking an electronic device with an authenticated wearable device.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

In this illustrative embodiment, server 200 may implement an apparatus that provides for random access of HEVC bitstreams for MMT, as will be discussed in greater detail below. Note that while FIG. 2 is described as representing the server 104 of FIG. 1, the same or similar structure could be used in one or more of the client devices 106-114. For example, a laptop or desktop computer could have the same or similar structure as that shown in FIG. 2.

As shown in FIG. 3, the client device 300 includes an antenna 305, a radio frequency (RF) transceiver 310, transmit (TX) processing circuitry 315, a microphone 320, and receive (RX) processing circuitry 325. The client device 300 also includes a speaker 330, a one or more processors 340, an input/output (I/O) interface (IF) 345, a touchscreen 350, a display 355, and a memory 360. The memory 360 includes a basic operating system (OS) program 361 and one or more applications 362.

The RF transceiver 310 receives, from the antenna 305, an incoming RF signal transmitted by another component in a system. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor(s) 340 for further processing (such as for web browsing data).

The TX processing circuitry 315 receives analog or digital voice data from the microphone 320 or other outgoing baseband data (such as web data, e-mail, or interactive video game data) from the processor(s) 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor(s) 340 can include one or more processors or other processing devices and execute the basic OS program 361 stored in the memory 360 in order to control the overall operation of the client device 300. For example, the processor(s) 340 could control the reception of forward channel signals and the transmission of reverse channel signals by the RF transceiver 310, the RX processing circuitry 325, and the TX processing circuitry 315 in accordance with well-known principles. In some embodiments, the processor(s) 340 includes at least one microprocessor or microcontroller.

The processor(s) 340 is also capable of executing other processes and programs resident in the memory 360, such as operations for randomly accessing HEVC bitstream for MMT. The processor(s) 340 can move data into or out of the memory 360 as required by an executing process. In some embodiments, the processor(s) 340 is configured to execute the applications 362 based on the OS program 361 or in response to signals received from external devices or an operator. The processor(s) 340 is also coupled to the I/O interface 345, which provides the client device 300 with the ability to connect to other devices such as laptop computers and handheld computers. The I/O interface 345 is the communication path between these accessories and the processor(s) 340.

The processor(s) 340 is also coupled to the touchscreen 350 and the display unit 355. The operator of the client device 300 can use the touchscreen 350 to enter data into the client device 300. The display 355 may be a liquid crystal display or other display capable of rendering text and/or at least limited graphics, such as from web sites.

The memory 360 is coupled to the processor(s) 340. Part of the memory 360 could include a random access memory (RAM), and another part of the memory 360 could include a flash memory or other read-only memory (ROM).

As will be discussed in greater detail below, in this illustrative embodiment, client device 300 implements an apparatus that receives encoded videos from server 104 over network 102 and randomly accessing HEVC bitstreams for MMT. Although FIGS. 2 and 3 illustrate examples of devices in a computing system, various changes may be made to FIGS. 2 and 3. For example, various components in FIGS. 2 and 3 could be combined, further subdivided, or omitted and additional components could be added according to particular needs. As a particular example, the processor(s) 340 could be divided into multiple processors, such as one or more central processing units (CPUs) and one or more graphics processing units (GPUs). Also, while FIG. 3 illustrates the client device 300 configured as a mobile telephone or smartphone, client devices could be configured to operate as other types of mobile or stationary devices. In addition, as with computing and communication networks, client devices and servers can come in a wide variety of configurations, and FIGS. 2 and 3 do not limit this disclosure to any particular client device or server.

Figure 4:
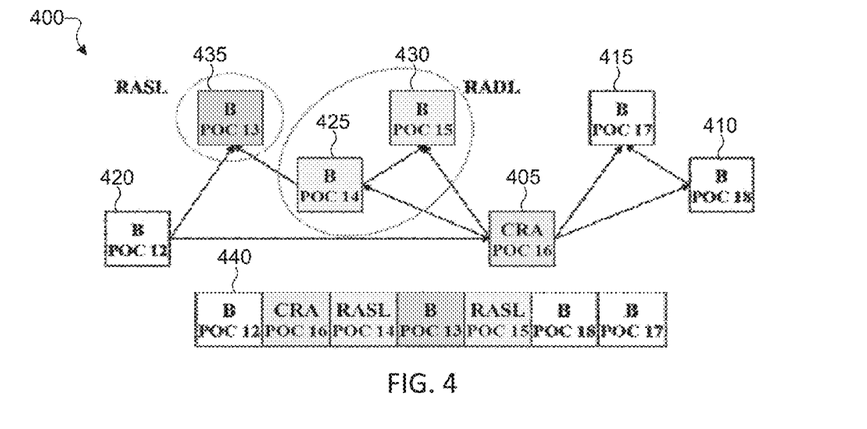
FIG. 4 illustrates an example HEVC bitstream according to various embodiments of the present disclosure.

FIG. 4 illustrates an example HEVC bitstream 400 according to various embodiments of the present disclosure.

In the HEVC bitstream 400 received by decoder, such as client device 300, the frames are transferred as independent frames 405, change frames 410, or compare frames 415, 420, 425 and 430. The initial frame of the bitstream 400 is transmitted as an independent frame 405. The change frames 410 are transmitted as changes from a previous frame. Each change frame 410 includes a tiny amount of distortion from the actual frame recorded. Transmitting changes between frames reduces the amount of data required for transfer and thus increases the overall transfer rate. The distortion in change frames 410 increases as the chain of change frames 410 increases. In order to remove the distortion in the video, an independent frame 405 is transmitted periodically to reset the distortion loss from the video.

To further reduce the distortion of the video, the change frame 410 does not have to be the frame directly following an independent frame 405 or another change frame 410. The system can detect the differences between two frames with a number of frames between, such as packet number 16 and packet number 18. In this case, packet number 17 is a compare packet 415. The system transmits the compare packet 415 information as the changes between the independent frame 405 or a previous change frame 140 and the next change frame 410 immediately following the independent frame 405 or the previous change frame 140. The sequence 440 could include multiple compare frames 415 between an independent frame 405 or change frame 410 and other change frames 410. The sequence 440 can also refer to a group of pictures. Frame 425, 430 and 435 are leading frames because they come before an independent frame 405.

As illustrated in FIG. 4, packet number 18 is an independent frame 405 in the middle of a HEVC sequence 440. Packet 12, as a last change frame 420 before a new independent frame 405, includes the distortion from all the change frames 410 that proceed up to the last full frame transmitted. A comparison with the last change frame 420 and an independent frame 405 would introduce unnecessary distortion, considering that the changes between packet 12 and 14 would incorporate the distortion accrued from the change frames 410 preceding packet 12. The system therefore transmits changes from the independent frame 405 to the preceding change frame 425. The system does use the changes compare frame 435 between the last change frame 420 and the preceding change frame 425. The compare frames 430 between the preceding change frame 425 and the independent frame 405 are transmitted normally with the changes from both the preceding change frame and the independent frame 405. FIG. 4 illustrates only one compare frame 435, but increasing the amount of frames between change frames 410 or an independent frame 405 would increase the amount of compare levels. Furthermore each frame can be divided into multiple packets or sub-frames. The multiple packets or sub-frames would be transmitted and compared similarly to the whole frames. The sequence 440 indicates the order of decoding or processing the video.

Figure 5:
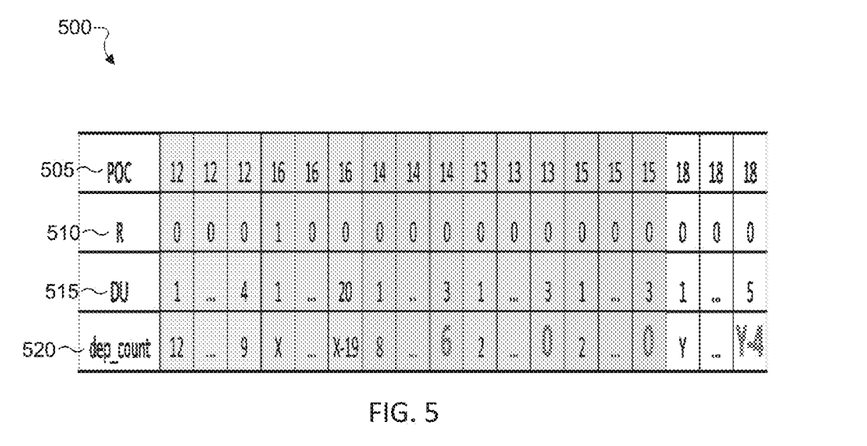
FIG. 5 illustrates an example packet header information according to various embodiments of the present disclosure.

FIG. 5 illustrates an example packet header information 500 according to various embodiments of the present disclosure.

The packet header information includes a packet number (POC) 505, a start indicator (R) 510, a delivery unit (DU) 515, and a dependency counter (dep_count) 520. The packet number indicates the frame or packet for information included in the sequence 440. The system identifies when the POC 505 changes. When a change in the POC 505 is detected, the system identifies the R 510, which signifies the start of the video. A '1' indicates the first packet and a '0' indicates that it is not the first packet. In FIG. 5, the first three columns are all part of packet 12, which the R 510 is not '1.' The system removes packet 12 from the sequence to be processed by the decoder. The system identifies that packet 16 includes an R 510 value of '1', indicating the start of the video. The system reviews the dep_count 520 to identify the following packets that values that reach 0, which includes packets 14, 13 and 15. These packets are identified as preceding packets and are also removed from the sequence 440. Packet 18 is not removed due to a dep_count greater than zero at the last column for the packet. The DU 515 indicates the amount of columns including packet information for each packet.

Figure 6:
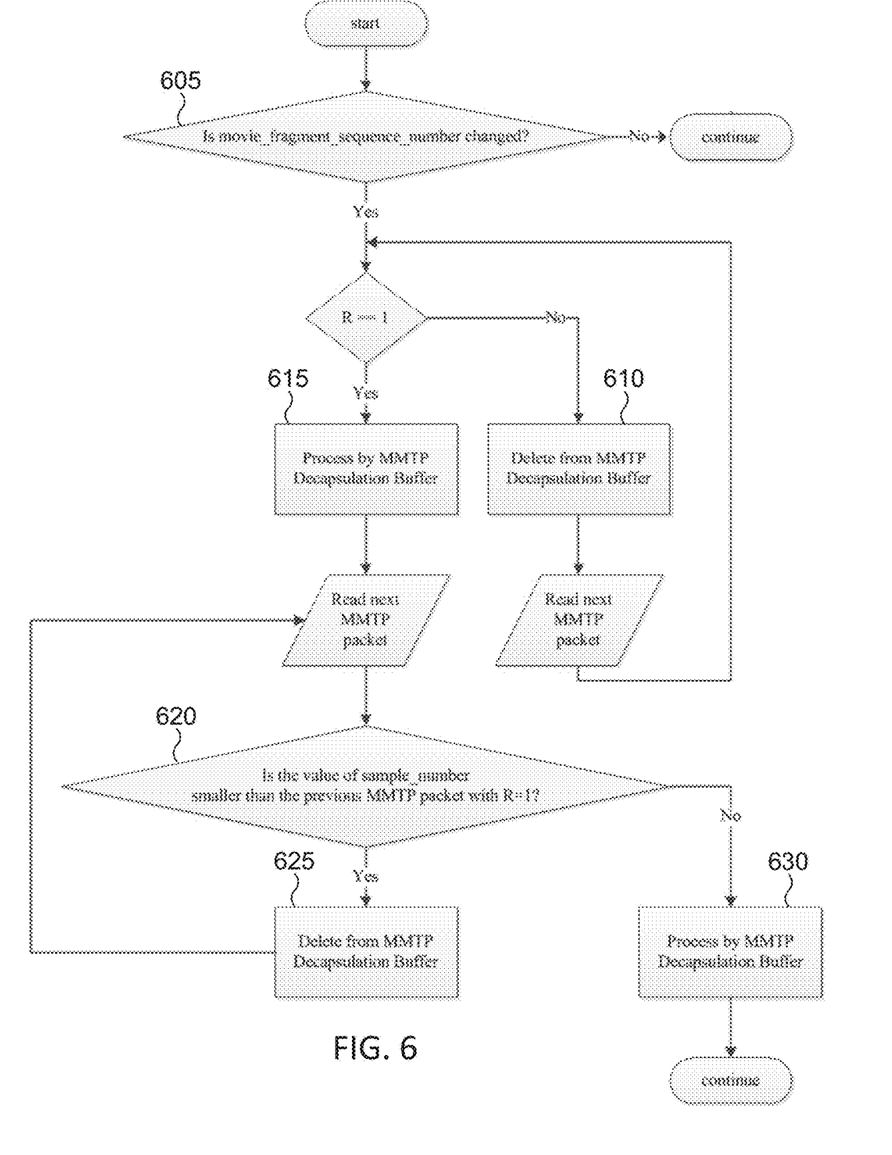
FIG. 6 illustrates an example process for randomly accessing HEVC bitstreams according to various embodiments of the present disclosure.

FIG. 6 illustrates an example process for randomly accessing HEVC bitstreams according to various embodiments of the present disclosure; and Following operation should be done by MMTP decapsulation buffer for each MMTP packets carrying metaframes for Unix (MFUs) of HEVC bitstream, the value of the FT field is equal to 2, to support use of HEVC bitstream with SAP type 2 or 3.

In operation 605, the system identifies a packet marked to begin processing the MMTP video bitstream. The first packet of a group of pictures is identified when the MMTP packets with a value of the movie_fragment_sequence_number field is different from the value of the same field of the preceding MMTP packets. The first MMTP packets and all succeeding MMTP packets in a picture with a value of the R field is equal to 0 are immediately deleted from the MMTP decapsulation buffer in operation 610. The packets in pictures with a first frame contains an R value equal to zero are not delivered to the decoder buffer. The MMTP packets with value of the movie_fragment_sequence_number field is same with the value of the same field of the previously received MMTP packet but the value of the R field is equal to 1, the initial picture to be process, is received in operation 615.

In operation 615, when the MMTP packets with a value the R field is equal to 1 is firstly received as described in the operation 605, such MMTP packet and all succeeding MMTP packets carrying MFUs belong to same AU are processed by the MMTP Decapsulation buffer and delivered to the decoder buffer.

In operation 620, the system identifies any leading frames in the group of pictures. After receiving MMTP packets with a value of the R field is equal to 1 is processed as described in the operation 615, all succeeding MMTP packets carrying MFUs with a value of the movie_fragment_sequence_number field is same with the value of the same field of the MMTP packets described in the operation 615 but the value of the sample_number field is smaller than the value of the same field of the MMTP packets described in the operation 615 are immediately deleted from the MMTP decapsulation buffer in operation 625 and they are not delivered to the decoder buffer until the MMTP packet with a value of the movie_fragment_sequence_number field is same with the value of the same field of the MMTP packets described in the operation 615 but the value of the sample_number field is greater than the value of the same field of the MMTP packets described in the operation 615 is received in operation 630.

Figure 7:
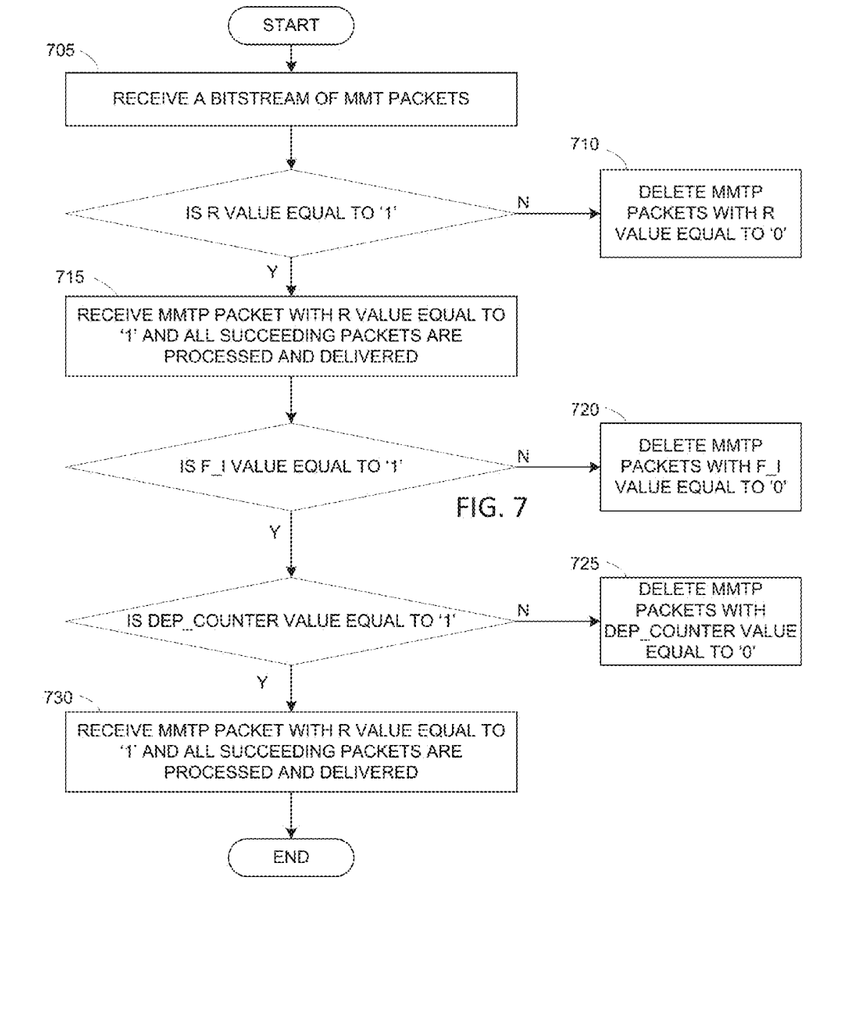
FIG. 7 illustrates another example process for randomly accessing HEVC bitstreams according to various embodiments of the present disclosure.

FIG. 7 illustrates another example process for randomly accessing HEVC bitstreams according to various embodiments of the present disclosure. The following operation is done by a MMTP decapsulation buffer for each MMTP packets carrying MFUs of HEVC bitstream, the value of the FT field is equal to 2, to support use of HEVC bitstream with SAP type 2 or 3.

In operation 705, the decoder receives a sequence of MMTP packets. In operation 710, when the MMTP packets with a value of the movie_fragment_sequence_number field is different from the value of the same field of the preceding MMTP packets is firstly received, the decoder deletes the MMTP packets and all succeeding MMTP packets with a value of the R field is equal to '0' from the MMTP decapsulation buffer. MMTP packets are not delivered to the decoder buffer until the MMTP packets, with a value of the movie_fragment_sequence_number field is same with the value of the same field of the previously received MMTP packet, but the value of the R field is equal to 1, are received.

In operation 715, when the MMTP packet with a value in the R field is equal to '1' is received as described in operation 705, the received MMTP packet and all succeeding MMTP packets carrying MFUs belong to the same AU are processed by the MMTP decapsulation buffer and delivered to the decoder buffer.

In operation 720, after receiving an MMTP packet with a value of the R field is equal to '1' is processed as described in the operation 710, all succeeding MMTP packets carrying MFUs with a value of the movie_fragment_sequence_number field is the same with the value of the same field of the MMTP packet described in the operation 710 are immediately deleted from the MMTP decapsulation buffer and they are not delivered to the decoder buffer until the MMTP packet with a value of the movie_fragment_sequence_number field is same with the value of the same field of the MMTP packets described in the operation 710, but the value of the dep_counter field is 0 as descripted in the operation 715, following operation to all succeeding MMTP packets carrying MFUs with a value of the movie_fragment_sequence_number field is same with the value of the same field of the MMTP packets described in the operation 715 are applied.

If the value of the f_i field of the MMTP packet is equal to '00,' all data units of such MMTP packet, with a value of the dep_counter field is '0,' are immediately deleted from the MMTP decapsulation buffer and they are not delivered to the decoder buffer until any data unit with a value of the dep_counter field is not equal to '0' is found.

If the value of the f_i field of the MMTP packet is not equal to '00', then this MMTP packet and all succeeding MMTP packets are stored in the MMTP decapsulation buffer and not process until the MMTP packet with a value of the f_i field is equal to '11' is received. If MMTP packets with a value of the f_i field is equal to '11' is received and with a value of the dep_counter field is equal to '0,' then all packets stored in the MMTP decapsulation buffer with a value of movie_fragment_sequence_number field and the value of the sample_number field is the same with such packet are immediately deleted form the MMTP decapsulation buffer and they are not delivered to the decoder buffer.

If the value of the f_i field of the MMTP packet is not equal to '00,' then this MMTP packet and all succeeding MMTP packets are stored in the MMTP decapsulation buffer and not process until the MMTP packet with a value of the f_i field is equal to '11' is received. If MMTP packets with a value of the f_i field is equal to '11' is received with a value of the dep_counter field is not equal to '0' then all packets stored in the MMTP decapsulation buffer with a value of movie_fragment_sequence_number field and the value of the sample_number field is the same with such packet are processed by the MMTP decapsulation buffer and delivered to the decoder buffer.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A decoder for randomly accessing high efficiency video coding (HEVC) bitstream for moving picture experts group (MPEG) media transport (MMT), the decoder comprising:
a memory configured to store a plurality of packets for a video; and
processing circuitry operably connected to the memory, the processing circuitry configured to:
receive the plurality of packets in decoding order;
determine a packet marked to begin processing the video, including
for each of the plurality of packets, determine whether a movie_fragment_sequence_number value of the packet is different than a movie_fragment_sequence_number value of a preceding packet, and
remove the packet if the movie_fragment_sequence_number value of the packet is equal to the movie_fragment_sequence_number value of the preceding packet
remove packets of leading pictures from the memory, wherein the packets of leading pictures are leading frames that come before an independent frame; and
process the packets remaining in the memory.

2. The decoder of Claim 1, wherein the processing circuitry is further configured to determine whether an R field value of a first packet is not '1' when the movie_fragment_sequence_number value of the packet is not equal to the movie_fragment_sequence_number value of the preceding packet.

3. The decoder of claim 2, wherein the processing circuitry is further configured to:
remove the packets until the packet whose R field value is '1' is received;
process the packets whose R field value is '1'; and
remove the packets until the packets whose dep_counter field value is '0', including this packet.

4. The decoder of claim 3, wherein the processing circuitry is further configured to remove the packets until the packets whose f_i field value is '00' and dep_counter field is '0' is found, including this packet.

5. The decoder of claim 4, wherein the processing circuitry is further configured to remove the packets until the packets whose f_i field value is '11' and dep_counter field is '0' is found, including this packet.

6. The decoder of claim 4, wherein the processing circuitry is further configured to process the packets containing a part of single video frame if the packet containing the same video frame and whose f_i field value is '11' and dep_counter field is not '0'.

7. A method for randomly accessing high efficiency video coding (HEVC) bitstream for moving picture experts group (MPEG) media transport (MMT), the method comprising:
receiving a plurality of packets for a video in decoding order;
determining a packet marked to begin processing the video, including
for each of the plurality of packets, determining whether a movie_fragment_sequence_number value of the packet is different than a movie_fragment_sequence_number value of a preceding packet, and
removing the packet if the movie_fragment_sequence_number value of the packet is equal to the movie_fragment_sequence_number value of the preceding packet;

removing packets of leading pictures from a memory, wherein the packets of leading pictures are leading frames that come before an independent frame; and processing the packets remaining in the memory.

8. The method of Claim 7, further comprising determining whether an R field value of a first packet is not '1' when the movie_fragment_sequence_number value of the packet is not equal to the movie_fragment_sequence_number value of the preceding packet.

9. The method of claim 8, further comprising:

removing the packets until the packet whose R field value is '1' is received;

processing the packets whose R field value is '1'; and removing the packets until the packets whose dep_counter field value is '0', including this packet.

10. The method of claim 9, further comprising removing the packets until the packets whose f_i field value is '00' and dep_counter field is '0' is found, including this packet.

11. The method of claim 10, further comprising removing the packets until the packets whose f_i field value is '11' and dep_counter field is '0' is found, including this packet.

12. The method of claim 10, further comprising processing the packets containing a part of single video frame if the packet containing the same video frame and whose f_i field value is '11' and dep_counter field is not '0'.

* * * * *